3,200,097
POLYANHYDRIDES
Thomas B. Windholz, Westfield, N.J., assignor to Celanese Corporation of America, New York, N.Y., a corporation of Delaware
No Drawing. Filed May 25, 1959, Ser. No. 815,257
10 Claims. (Cl. 260—75)

This invention relates to novel polymeric intermediates which are useful in the production of polyesters, to a novel method for preparing such intermediates and to a novel method for preparing polyesters by the use of such polymeric intermediates.

Polyesters of saturated polycarboxylic acids and saturated polyols are known to be useful in the production of high tenacity filaments and self-supporting films. Polyesters containing ethylenic unsaturation are known to be useful in the production of protective coatings and in the formation of laminates with glass fibers.

In accordance with this invention a polymeric mixed anhydride of a polycarboxylic acid, and preferably a dicarboxylic acid, and a polycarbonic ester, and preferably a bis-carbonic ester, is formed. These anhydrides may be decomposed to form polyesters with the preferred anhydrides forming linear polyesters.

The polymeric mixed anhydrides of dicarboxylic acids and bis-carbonic esters are generally of the recurring formula:

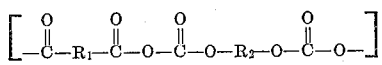

wherein $R_1$ and $R_2$ are divalent radicals and $R_2$ has aliphatic carbon atoms at its ends. The polymeric mixed anhydrides are generally of a chain length in excess of about six of the above described recurring units.

The preferred polymeric mixed anhydrides are prepared by reacting a salt of a dicarboxylic acid

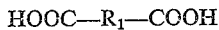

with a bis-chloroformate of a glycol HO—$R_2$—OH. ($R_1$ and $R_2$ are defined as above.) Bis-chloroformates of glycols are prepared by known procedures involving the reaction of 1 mole of a glycol with 2 moles of phosgene. The bis-chloroformates of relatively short-chain diols such as ethylene glycol, trimethylene glycol and 1,4-butane-diol, for example are preferred. Higher glycols wherein the alkylene chain contains a greater number of carbon atoms and may be a straight chain or a branched chain are also satisfactory. Examples of other diols whose bis-chloroformates may be employed are ω,ω'-dihydroxy-dialkyl ethers (e.g. β,β'-dihydroxy diethyl ether); ω,ω'-dihydroxy-dialkyl thioethers (e.g. β,β'-dihydroxy diethyl thioether); bis-glycol or diglycol esters of straight chain or branched chain aliphatic dicarboxylic acids such as the bis-ethylene glycol ester of pimelic acid, the bis-ethylene glycol ester of suberic acid, azelaic acid or sebacic acid; the diol, dimer or trimer esters obtained by the reaction of an excess of an aliphatic glycol with a dicarboxylic acid of the several aliphatic dicarboxylic acids mentioned above, ω,ω'-dihydroxy dialkyl ethers (e.g. β,β'-dihydroxy diethyl ether) of hydroquinone; ω,ω'-dihydroxy dialkyl ethers (e.g. β,β'-dihydroxy diethyl ether) of dihydroxy cyclohexane; ω,ω'-sulfonyl bis-alkanols, i.e. bis - (ω - hydroxyalkyl-sulfones) and particularly bis - (β - hydroxyethyl-sulfone); N,N'-(ω-hydroxyalkyl) - dicarboxyamides such as N,N'-(β,β'-dihydroxydiethyl)-adipamide, cycloaliphatic glycols as cyclohexylene glycol, dihydroxy tetrahydrofurane, hydroxy-hydroxymethyl furane, hydroxy-hydroxymethyl tetrahydrofurane, 1,4-dimethylol cyclohexane and dihydroxy-oxathiane dioxide. Glycols having hydroxy groups attached to aliphatic carbon atoms but having one or more aromatic rings in their structure may also be used, including p-xylylene glycol, m-xylylene glycol and o-xylylene glycol.

The bis-chloroformate of the diol is reacted with a salt of a dibasic acid, preferably in the presence of a common solvent. The salt may be prepared in situ by the reaction of the acid with an acid binding agent, generally a weakly basic material, such as a tertiary amine. Trialkyl amines, such as triethyl amine and tributyl amine; triaryl amines, such as triphenyl amine; alkyl-aryl tertiary amines, such as N,N-dimethyl aniline and heterocyclic amines, such as pyridine are suitable acid binding agents and produce in situ the corresponding tertiary amine salts of the dibasic acids.

Other suitable salts of the dibasic acids include the alkali metal salts and the ammonium salts.

For self-supporting film and filament-forming purposes, the preferred dicarboxylic acids are terephthalic acid and other aromatic dicarboxylic acids having carboxylic acid groups at opposite ends of the molecule, such as diphenyl-4,4'-dicarboxylic acid, alpha,beta-diphenyl ethane-4,4'-dicarboxylic acid, alpha,delta-diphenyl butane-4,4'-dicarboxylic acid and other alpha,omega-diphenyl alkane-4,4'-dicarboxylic acids, alpha,beta-diphenoxyethane-4,4'-dicarboxylic acid, alpha,delta-diphenoxybutane-4,4'-dicarboxylic acid and other alpha,omega-diphenoxyalkane-4,4'-dicarboxylic acids.

When a polyester containing ethylenic unsaturation is desired as the final product one may produce the mixed anhydride by utilizing a dicarboxylic acid containing ethylenic unsaturation such as maleic acid, fumaric acid or itaconic acid or a mixture of an ethylenically unsaturated dicarboxylic acid with a saturated dicarboxylic acid such as phthalic acid.

The solvent used in producing the polymeric mixed anhydride may be any liquid material which is a solvent for the bis-chloroformate and a solvent for the salt of the dicarboxylic acid. Preferably, a solvent having a boiling point between about 50° and about 150° C. is used. Solvents boiling within the preferred range have boiling points which are high enough to permit the reaction to take place at suitably high temperatures without the use of pressure and, at the same time, are low enough to permit the separation of the solvent from the reaction mixture by distillation. Dimethyl formamide is generally a suitable solvent. Other suitable solvents include diethyl ether, toluene, tetrahydrofuran and chloroform. Generally, solvents are used in amounts such that the reactants comprise between about 5 and about 30 weight percent of the solution.

The bis-chloroformate and the dicarboxylic acid are fed to the reaction mixture in approximately stoichiometric proportions, i.e., 1 mole of dicarboxylic acid for 1 mole of bis-chloroformate. Either reactant may be in slight excess, but a substantial excess will result in reduction of the chain length of the polymer.

The acid binding agent is also used in stoichiometric quantities or slight stoichiometric excess. Two moles of hydrochloric acid must be removed for each 1 mole of dicarboxylic acid and 1 mole of bis-chloroformate which are reacted. Two equivalents of acid binding agent are stoichiometrically necessary. Preferably the proportion of acid binding agent is from about 2.0 to 2.25 equivalents for each mole of dicarboxylic acid to be reacted.

The polymeric mixed anhydrides of this invention are conveniently prepared at temperatures ranging from about −15° to about +25° C. and over a period from about 20 to about 120 minutes. As stated above, when a suitable solvent is used, the reaction may be carried out at or below the boiling point of the solvent.

After the reaction is completed, the solvent is removed, generally by distillation, and the desired mixed anhydride is precipitated from the residue by pouring the residue into cold water.

The polymeric mixed anhydrides of this invention are converted to polyesters by the loss of 2 moles of carbon dioxide per repeating unit. The reaction generally takes place at elevated temperatures between about 60° and 300° C., and is generally accompanied by purging with an inert gas, such as nitrogen. The period required for this reaction may generally vary between about 1 and about 6 hours. If desired, the reaction temperature may be lowered below the range specified above with a corresponding extension of the reaction period.

The polymeric mixed anhydrides, when prepared as described above, are generally of sufficiently high molecular weight so that upon removal of carbon dioxide, a polyester of useful molecular weight is obtained.

*Example I*

To a solution of 16.6 grams of terephthalic acid in 100 ml. of N,N-dimethyl formamide and 28 ml. of triethyl amine, 18.6 grams of ethylene glycol bis-chloroformate was added with stirring and refluxed at 155° C. for 3 hours. After cooling the precipitate was filtered off, corresponding to a substantially quantitative yield of triethylamine hydrochloride.

The filtrate was freed from dimethyl formamide by distillation and the viscous residue was poured into ice water. A precipitate was obtained which had a melting point of 155 to 160° C.

The precipitate was a poly-terephthalic ethylene carbonic anhydride, having the recurring structure:

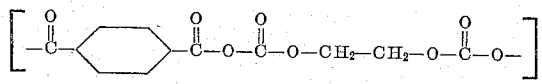

When this material was heated for 3½ hours at 280° C. at atmospheric pressure, under a blanketing stream of nitrogen, without a catalyst, it gave polyethylene terephthalate with a melting point of 258 to 262° C., which could be drawn into fibers.

*Example II*

To a mixture of 2.92 grams of adipic acid and 4.05 grams of triethylamine in 70 ml. of tetrahydrofuran was added a mixture of 3.78 grams of ethylene glycol bis-chloroformate and 15 ml. of tetrahydrofuran. During the addition the temperature was maintained between −10° and −5° C. The reaction mixture was allowed to warm up gradually and stirred for one hour at room temperature. The triethylamine hydrochloride salt, which formed as a precipitate was filtered off. The filtrate was concentrated in vacuo and yielded 4.95 grams of oily poly-adipic ethylene carbonic anhydride, having the recurring structure:

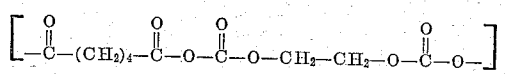

It is to be understood that the foregoing detailed description is given merely by way of illustration and that many variations may be made therein without departing from the spirit of my invention.

Having described my invention what I desire to secure by Letters Patent is:

1. A polymeric mixed anhydride of a dicarboxylic acid and a bis-carbonic ester, said polymeric mixed anhydride consisting essentially of at least six successively recurring units of the formula

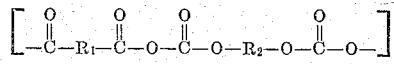

wherein $R_1$ and $R_2$ each represent a divalent organic radical, $R_2$ having an aliphatic carbon atom at each of its divalent ends.

2. The polymeric mixed anhydride of claim 1 wherein $R_1$ is an arylene group, and $R_2$ is an alkylene group having from 2–8 carbon atoms.

3. A polymeric mixed anhydride consisting essentially of successively recurring units of the formula:

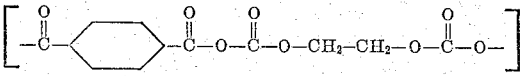

4. A method of preparing a polymeric mixed anhydride of a dicarboxylic acid and a bis-carbonic ester, said polymeric mixed anhydride consisting essentially of at least six successively recurring units of the formula

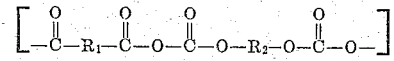

wherein $R_1$ and $R_2$ are divalent organic radicals and $R_2$ has an aliphatic carbon atom at each of its divalent ends, which comprises bringing into reactive contact (1) a salt of a dicarboxylic acid and (2) a bis-chloroformate of a diol, these reactants being present in substantially stoichiometric proportions, and recovering said polymeric mixed anhydride.

5. The process of claim 4 wherein reaction is made to take place in the presence of an acid binding agent.

6. The process of claim 4 wherein reaction is made to take place in the presence of an acid binding agent, said acid binding agent being present in a substantially stoichiometric amount, based upon reactants (1) and (2).

7. The method of preparing a polymeric mixed anhydride consisting essentially of at least six successively recurring units of the formula:

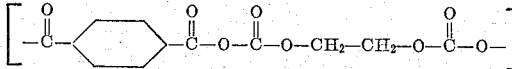

which comprises bringing into reactive contact (1) a terephthalic acid salt and (2) ethylene glycol bis-chloroformate, in a common solvent in the presence of a tertiary amine, these reactants being present in substantially stoichiometric proportions, and recovering said polymeric mixed anhydride of the formula above.

8. The process of claim 7 in which reaction is made to take place at a temperature between about −15° C. and about 25° C. for a period between about 20 minutes and about 120 minutes.

9. A method of making a resinous polyester which comprises decarboxylating a polymeric mixed anhydride of a dicarboxylic acid and a bis-carbonic ester, said polymeric mixed anhydride consisting essentially of at least six successively recurring units of the formula

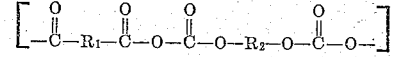

wherein $R_1$ and $R_2$ are divalent organic radicals and $R_2$ has an aliphatic carbon atom at each of its divalent ends, by heating said polymeric mixed anhydride to a temperature between about 60° C. and about 300° C., and recovering a polyester having successively recurring units of the formula

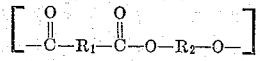

wherein $R_1$ and $R_2$ are the same as in said polymeric mixed anhydride formula above.

19. The process of claim 9 wherein $R_1$ is an arylene group and $R_2$ is an alkylene group having 2–8 carbon atoms.

References Cited by the Examiner

UNITED STATES PATENTS

| | | | |
|---|---|---|---|
| 2,787,630 | 4/57 | Katz | 260—463 |
| 2,799,667 | 7/57 | Drewitt | 260—77.5 |
| 2,808,390 | 10/57 | Caldwell | 260—75 |
| 2,870,124 | 1/59 | Ham | 260—75 |
| 3,030,331 | 4/62 | Goldberg | 260—47 |

FOREIGN PATENTS 801,412   9/58   Great Britain.

OTHER REFERENCES

Page 58, Chem. & Eng. News, Oct. 7, 1957, vol. 35, No. 40, "Polymers at Prague."

WILLIAM H. SHORT, *Primary Examiner.*

MILTON STERMAN, PHILIP MANGAN, LOUISE P. QUAST, *Examiners.*